United States Patent
Hallberg

(10) Patent No.: US 10,281,280 B2
(45) Date of Patent: May 7, 2019

(54) SYSTEM AND METHOD FOR SELECTIVELY ENABLING INERTIAL MEASUREMENT UNIT (IMU) SENSORS

(71) Applicant: Sharp Laboratories of America, Inc., Camas, WA (US)

(72) Inventor: Bryan Severt Hallberg, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 78 days.

(21) Appl. No.: 15/368,631

(22) Filed: Dec. 4, 2016

(65) Prior Publication Data

US 2018/0156617 A1    Jun. 7, 2018

(51) Int. Cl.
G01C 25/00    (2006.01)
G01C 21/16    (2006.01)

(52) U.S. Cl.
CPC .................. *G01C 21/165* (2013.01)

(58) Field of Classification Search
CPC .............................. G01C 25/00; G01C 25/005
USPC ...................... 73/1.79, 1.77; 702/92–95, 104
See application file for complete search history.

(56) References Cited

U.S. PATENT DOCUMENTS

2005/0126022 A1*    6/2005    Hansberry ............ E21B 47/022
                                                                    33/313

* cited by examiner

Primary Examiner — Robert R Raevis
(74) Attorney, Agent, or Firm — ScienBiziP, PC; Alvin Koan

(57) ABSTRACT

A method is provided for selectively enabling inertial measurement unit (IMU) sensors. The method comprises enabling a gyroscope of the IMU sensors for generating a device orientation output estimate, selectively enabling an accelerometer of the IMU sensors for improving the device orientation output estimate when a magnitude of an angular velocity is less than a centripetal velocity threshold, an accelerometer jitter error estimate is less than a gyroscopic orientation error estimate, a filled accelerometer filter length is less than a full length of an accelerometer filter, and a filled magnetometer filter length is less than a full length of a magnetometer filter. The method also includes enabling a magnetometer of the IMU sensors when the accelerometer is enabled, and an accelerometer gravitational error angle is less than a predetermined accelerometer gravitational error angle threshold.

8 Claims, 5 Drawing Sheets

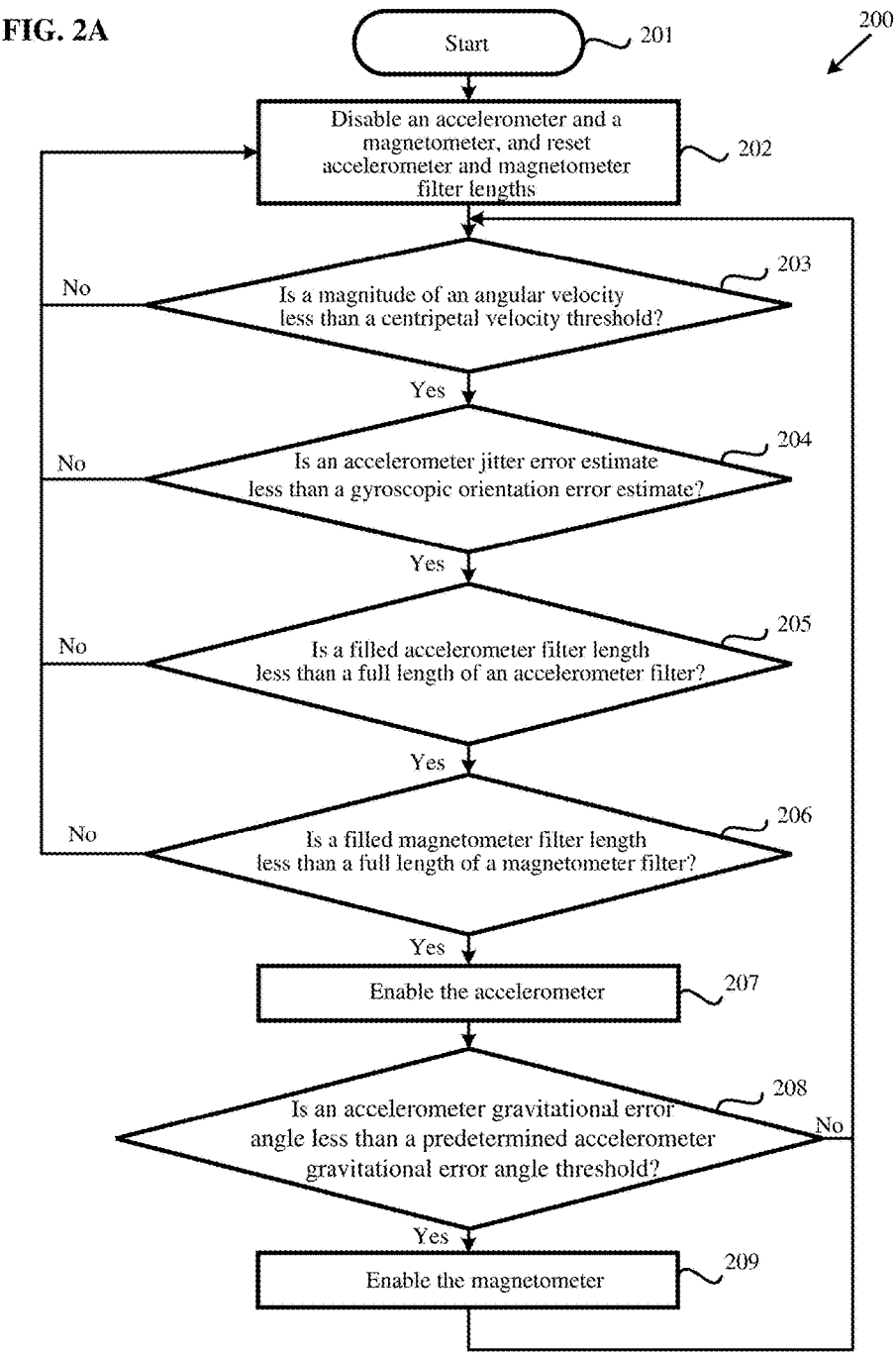

SYSTEM AND METHOD FOR SELECTIVELY ENABLING INERTIAL MEASUREMENT UNIT (IMU) SENSORS

RELATED APPLICATION(S)

The present application is related to U.S. patent application Ser. No. 14/873,946, filed Oct. 2, 2015, entitled "SYSTEM AND METHOD FOR DETERMINING THE ORIENTATION OF AN INTERTIAL MEASUREMENT UNIT (IMU)," invented by Bryan Severt Hallberg. Application Ser. No. 14/873,946 is hereby incorporated fully by reference into the present application.

TECHNICAL FIELD

The present application generally relates to power savings in orientation sensing devices that use inertial measurement units (IMUs) having multiple single- or multi-axis orientation sensors, such as gyroscopes, accelerometers, and magnetometers.

BACKGROUND

Orientation sensing devices typically use IMUs containing three types of sensors, namely, gyroscopes, accelerometers, and magnetometers, to determine their orientation relative to Earth. A method for performing such operation is disclosed in the 14/873,946 application. For example, the IMU's accelerometers and magnetometers can be used to determine a field orientation estimate of the orientation sensing device based upon Earth's gravitational and magnetic fields when the device is relatively still. A separate gyroscopic orientation estimate can be also determined using the previous device orientation estimate and the most recent gyroscope reading. The field and gyroscopic orientation estimates can be combined based on relative sensor error estimates to provide an output device orientation estimate.

The IMU's accelerometers measure the orientation sensing device's centripetal acceleration in addition to gravitational acceleration. Thus, when the orientation sensing device is undergoing significant centripetal acceleration relative to gravitational acceleration, the field orientation estimate generation is adversely affected, resulting in a poor orientation estimate, which is discarded because of its poor value.

When the orientation sensing device is relatively still and its orientation is not changing, the current field orientation estimate produces the same result as the previous estimate, due to the lack of changing orientation. Even after the device has moved and is still again, the gyroscopic orientation estimate may be as accurate as the field orientation estimate, due to the inherent jitter in the IMU's magnetometer readings.

Methods exist for fusing IMU sensor values together to determine device orientation and mitigate sensor offsets and jitters, but they typically employ Kalman filters, which require all of the sensor inputs (gyroscope, accelerometer, and magnetometer) all of the time. As a result, the IMUs employing these methodologies typically require more expensive and current consuming processors. The larger current consumption results in the need for larger batteries or reduced operational time.

SUMMARY

As mentioned above, prior systems pose serious battery drains to the orientation sensing devices, as they require high electrical power to estimate the output device orientation using all of the IMU sensors all of the time. Accordingly, the present disclosure is generally directed to a system and method for selectively enabling an IMU's sensors to extend the battery life of an orientation sensing device.

The sensor enabling method selectively enables the IMU's accelerometer and magnetometer only when a field orientation estimate derived from the accelerometer and magnetometer readings is likely to improve an output device orientation estimate of an orientation sensing device relative to using just a gyroscopic orientation estimate derived from a gyroscope of the orientation sensing device.

In an exemplary embodiment, the sensor enabling method first uses gyroscopic measurements to estimate a centripetal angular error, which is the error introduced into gravitational acceleration measurements by centripetal acceleration. If the centripetal angular error of gravity's measured direction is less than a predetermined maximum allowed centripetal angular error threshold, then the method further determines whether an accelerometer jitter error estimate is less than a gyroscopic orientation error estimate. If the accelerometer jitter error estimate is less than the gyroscopic orientation error estimate, and if an accelerometer filter length and a magnetometer filter length are less than the full length of the respective filters, then the method enables the accelerometer and uses its readings to determine an accelerometer gravitational error angle based upon the difference between the magnitude of the measured acceleration and the magnitude of gravity. If the accelerometer gravitational error angle is less than a predetermined minimum value, while the accelerometer is enabled, then the method enables the magnetometer, allowing an orientation computation method to begin determining a field orientation estimate.

The sensor enabling method signals to the orientation computation method when both the accelerometer and magnetometer are disabled and enabled, such that the orientation computation method does not process disabled sensor data. The sensor enabling method also receives feedback from the orientation computation method indicating when the orientation estimation method no longer needs updates from the accelerometer and magnetometer. For example, the orientation estimation method may use the accelerometer and magnetometer filters which are reset while the accelerometer and magnetometer are disabled, and begin filling once the accelerometer and magnetometer are both enabled. When the orientation sensing device is relatively still, the outputs of the filters stabilize as both filters are filled, and additional updates do not significantly improve the orientation estimation. The sensor enabling method then disables the accelerometer and magnetometer.

The sensor enabling method then monitors the gyroscope readings and estimates the gyroscopic drift error. When the gyroscopic drift error is estimated to be greater than the accelerometer and magnetometer measurement errors, and the gyroscope reading indicates that accelerometer reading magnitude is likely to be near gravity's magnitude, then the sensor enabling method re-enables the accelerometer and magnetometer, allowing the orientation computation method to determine the field orientation estimate.

Some unique aspects of the methodology disclosed herein include the ability to selectively enable an orientation sensor's accelerometer and magnetometer only when their readings improve the orientation estimate. The accelerometer is enabled only when a magnitude of an angular velocity is less than a centripetal velocity threshold, an accelerometer jitter error estimate is less than a gyroscopic orientation error estimate, a filled accelerometer filter length is less than a full length of an accelerometer filter, and a filled magnetometer filter length is less than a full length of a magnetometer filter. The magnetometer is enabled only when the accelerometer is enabled and an accelerometer gravitational error angle is less than a predetermined accelerometer gravitational error angle threshold.

The accelerometer and magnetometer are disabled when the orientation sensing device's gyroscopic orientation estimate is as accurate as the field orientation estimate. That is, the accelerometer and magnetometer are disabled when a first predetermined number of consecutive accelerometer samples are within a predetermined magnitude of gravity and a second predetermined number of consecutive magnetometer samples are within a predetermined orientation angular distance of each other.

Additional details of the above-described methods and an orientation sensing device are provided below.

BRIEF DESCRIPTION OF THE DRAWINGS

FIG. 2A is a flowchart illustrating a method for selectively enabling IMU sensors according to an exemplary embodiment of the present application.

DETAILED DESCRIPTION

Figure 1A:
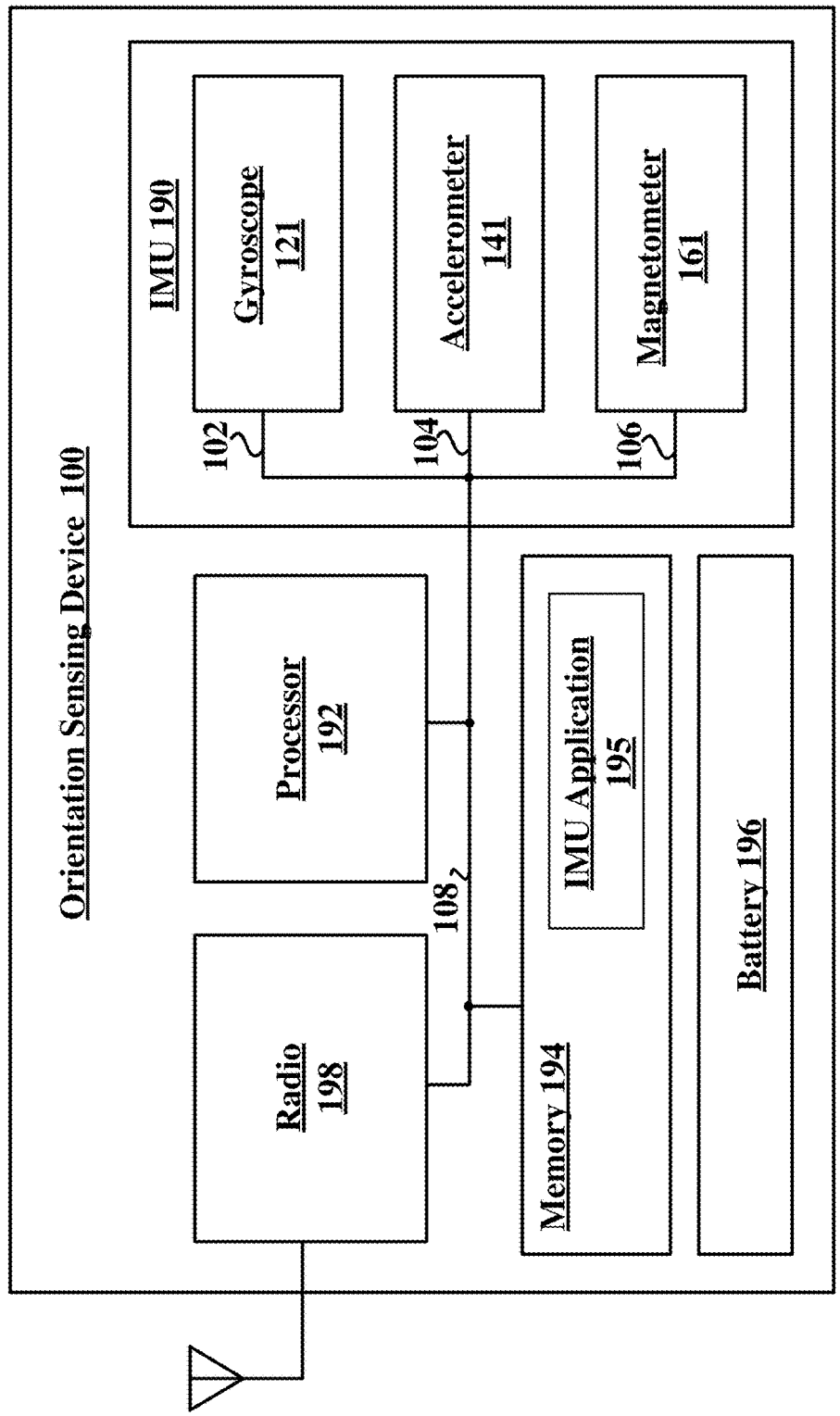
FIG. 1A is a schematic block diagram of an orientation sensing device having inertial measurement unit (IMU) sensors according to an exemplary embodiment of the present application.

The following description contains specific information pertaining to implementations in the present disclosure. The drawings in the present application and their accompanying detailed description are directed to merely exemplary embodiments. However, the present application is not limited to merely these exemplary embodiments. Other variations and embodiments of the present application will occur to those skilled in the art. Unless noted otherwise, like or corresponding elements among the figures may be indicated by like or corresponding reference numerals. Moreover, the drawings and illustrations in the present application are generally not to scale, and are not intended to correspond to actual relative dimensions.

Referring to FIG. 1A, FIG. 1A is a schematic block diagram of an orientation sensing device having inertial measurement unit (IMU) sensors according to an exemplary embodiment of the present application. As illustrated in FIG. 1A, an orientation sensing device 100 comprises an inertial measurement unit (IMU) 190, a processor 192, a non-transitory memory 194, a battery 196, and a radio 198. The IMU 190 comprises a gyroscope 121, an accelerometer 141, and a magnetometer 161, which are collectively referred to as IMU sensors.

In FIG. 1A, the orientation sensing device 100 employs lines 102, 104 and 106 and a communication bus 108 for communicating information among the IMU sensors (e.g., the gyroscope 121, the accelerometer 141, and the magnetometer 161), the processor 192, the non-transitory memory 194, and the radio 198. For example, the gyroscope 121 has an output on the line 102 for supplying gyroscopic readings, such as angular velocity readings. The accelerometer 141 has an output on the line 104 for supplying accelerometer readings, such as linear acceleration readings. The magnetometer 161 has an output on the line 106 for supplying magnetometer readings, such as magnetic field readings. The communication bus 108 may, for example, be a Serial Peripheral Interface (SPI), an Inter-Integrated Circuit (I²C), a Universal Asynchronous Receiver/Transmitter (UART), and/or any other suitable bus or network.

The non-transitory memory 194 may include a main memory, a random access memory (RAM), or other dynamic storage devices. These memories may also be referred to as a computer-readable medium. Such a medium may take many forms, including but not limited to, non-volatile media, volatile media, and transmission media. Non-volatile media includes, for example, optical or magnetic disks. Volatile media includes dynamic memory. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read. The execution of the sequences of instructions contained in a computer-readable medium may cause the processor 192 to perform some of the steps of estimating readings and calculating quaternions. Alternately, some of these functions may be performed in hardware (not shown). In one aspect, the processor 192 is an ARM processor using a reduced instruction set computing (RISC) architecture. The non-transitory memory 194 stores data from the IMU sensors and the processor 192. The non-transitory memory 194 also stores an IMU application 195 having a sequence of processor executable instructions for selectively enabling and disabling the IMU sensors, and computing the orientation estimate of the orientation sensing device 100. The non-transitory memory 194 also contains predetermined threshold values and other data for selectively enabling and disabling the IMU sensors, and computing the orientation estimate of the orientation sensing device 100.

The orientation sensing device 100 is a battery-operated device, where the battery 196 supplies power, for example, in the form of electrical current to the IMU 190, the processor 192, the non-transitory memory 194, the radio 198, and other components (not explicitly shown in FIG. 1A) of the orientation sensing device 100. The radio 198 may communicate wireless signals between the orientation sensing device 100 and other orientation sensing devices or a data hub (not explicitly shown in FIG. 1A). The orientation sensing device 100 may be considered a type of special purpose computing system, and as such, can be programmed, configured, and/or otherwise designed to comply with one or more networking protocols. Exemplary implementations of the orientation sensing device 100 may include, but are not limited to, body motion tracking devices, sports performance tracking devices, joint replacement patient recovery monitoring devices, interactive gaming sensors, and aging-in-place tracking devices.

Figure 1B:
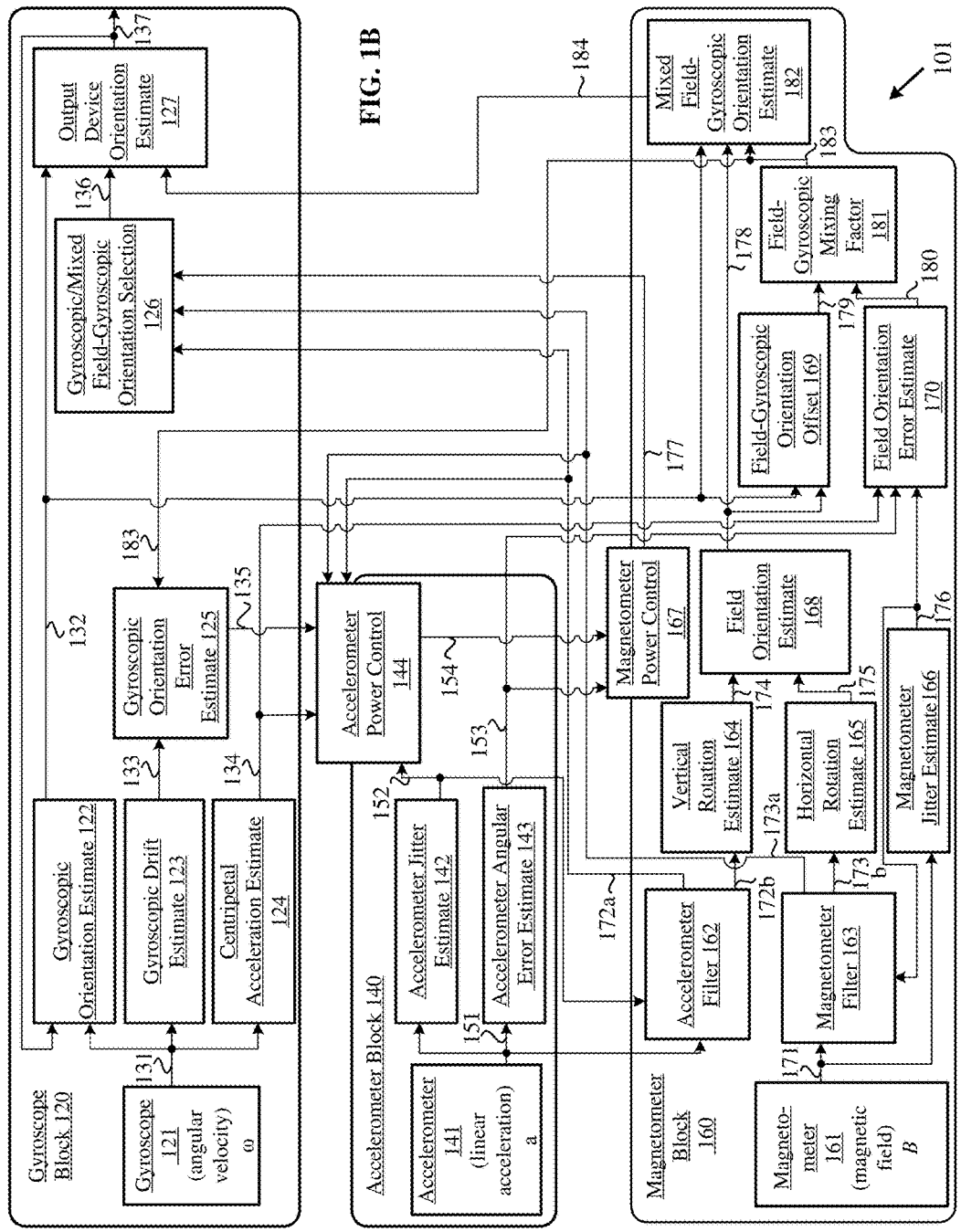
FIG. 1B is a schematic block diagram illustrating a method for selectively enabling IMU sensors according to an exemplary embodiment of the present application.

FIG. 1B is a schematic block diagram illustrating a method for selectively enabling IMU sensors according to an exemplary embodiment of the present application. In FIG. 1B, a diagram 101 comprises three distinct sensing and processing blocks, namely, a gyroscope block 120, an accelerometer block 140, and a magnetometer block 160, where the three sensing and processing blocks are selectively enabled to provide an output device orientation estimate of an orientation sensing device in which they reside. According to the exemplary method, the accelerometer block 140 and the magnetometer block 160 are selectively enabled to improve the output device orientation estimate of the orientation sensing device. According to the exemplary method, the accelerometer block 140 and the magnetometer block 160 are disabled when it is determined that even if the accelerometer and magnetometer were enabled, their readings would be unlikely to improve the output device orientation estimate. Therefore, by disabling the accelerometer block 140 and the magnetometer block 160, the battery life of the orientation sensing device can be substantially extended.

Referring to the gyroscope block 120, the gyroscope block 120 comprises a gyroscope 121, a gyroscopic orientation estimate block 122, a gyroscopic drift estimate block 123, a centripetal acceleration estimate block 124, a gyroscopic orientation error estimate block 125, a gyroscopic/mixed field-gyroscopic orientation selection block 126, and an output device orientation estimate block 127. In the present exemplary embodiment, the gyroscope 121 in the gyroscope block 120 may correspond to the gyroscope 121 in FIG. 1A, while the remaining functional blocks in the gyroscope block 120 may be part of the IMU application 195 in FIG. 1A. In the present exemplary embodiment, the gyroscope block 120 is configured to process gyroscopic inputs or readings from the gyroscope 121 and provide an output device orientation estimate 137, which is selected from either a gyroscopic orientation estimate 132 or a mixed field-gyroscopic orientation estimate 184, as will be discussed in detail below.

In FIG. 1B, the gyroscope 121 provides a gyroscopic input 131 to the gyroscopic orientation estimate block 122, the gyroscopic drift estimate block 123, and the centripetal acceleration estimate block 124. For example, a gyroscopic reading (e.g., sample n+1) arrives from the gyroscope 121. The gyroscopic reading is forwarded to the gyroscopic orientation estimate block 122, which estimates an updated gyroscopic orientation estimate 132. By way of example, the updated gyroscopic orientation estimate 132 is represented by a gyroscopic quaternion, $_E^S Q_{\omega,i+1}$, which is the orientation sensing device's updated gyroscopic orientation estimate relative to Earth.

$_E^S Q_i$ = previous gyroscopic orientation quaternion $G_\omega = (0, \omega_x, \omega_y, \omega_z)$ = gyroscope reading $_E^S \dot{Q}_\omega = \frac{1}{2} {}_E^S Q_i G_\omega$ = orientation rate of change $\Delta Q_\omega = {}_E^S \dot{Q}_\omega \Delta t$ $_E^S Q_{\omega,i+1} = {}_E^S Q_i + \Delta Q_\omega = {}_E^S Q_i + \frac{1}{2} {}_E^S Q_i G_\omega \Delta t =$ updated gyroscopic orientation quaternion after time $\Delta t$ The gyroscopic orientation estimate 132 is provided to the output device orientation estimate block 127 for possible output, depending upon the result from the gyroscopic/mixed field-gyroscopic orientation selection block 126.

In the exemplary embodiment, the gyroscopic/mixed field-gyroscopic orientation selection block 126 receives the filled filter length results from an accelerometer filter 162 and a magnetometer filter 163 along with a magnetometer enable/disable signal 177 from a magnetometer power control block 167 to determine whether the output device orientation estimate block 127 will output the gyroscopic orientation estimate 132 or the mixed field-gyroscopic orientation estimate 184 as the output device orientation estimate 137. For example, the output device orientation estimate block 127 may be a multiplexer, while the gyroscopic/mixed field-gyroscopic orientation selection block 126 may be an address decoder for the multiplexer.

The gyroscopic/mixed field-gyroscopic orientation selection block 126 provides a gyroscopic/mixed field-gyroscopic orientation select signal 136 to the output device orientation estimate block 127. For example, the gyroscopic/mixed field-gyroscopic orientation select signal 136 is a gyroscopic orientation estimate select signal (Gsel) to select the gyroscopic orientation estimate 132 as the output device orientation estimate 137, when:

(1) a filled accelerometer filter length 172a is less than a predetermined accelerometer filter length minimum (e.g., 4) (i.e., $L_{fa} < L_{fa,min}$); or (2) a filled magnetometer filter length 173a is less than less than a predetermined magnetometer filter length minimum (e.g., 4) (i.e., $L_{fm} < L_{fm,min}$); or (3) the magnetometer power control block 167 provides a disable signal to disable a magnetometer 161 (i.e., $C_{pm}$=disabled).

$G_{Sel} = (L_{fa} < L_{fa,min}) \| (L_{fm} < L_{fm,min}) \| (C_{pm}=\text{disabled})$ $G_{Sel}$=Gyroscopic orientation estimate select
$L_{fa}$=Accelerometer filter length
$L_{fa,min}$=Accelerometer filter length minimum
$L_{fm}$=Magnetometer filter length
$L_{fm,min}$=Magnetometer filter length minimum
$C_{pm}$=Magnetometer power control The output device orientation estimate 137 is fed back to the gyroscopic orientation estimate block 122 for determining the next updated gyroscopic orientation estimate 132, for example.

In the gyroscope block 120, the gyroscope 121 also provides the gyroscopic input 131 to the gyroscopic drift estimate block 123, which estimates the amount of drift the gyroscope 121 has undergone since the last sample. In general, gyroscopes have an inherent drift even when sitting still. This gyroscopic drift can be removed by recording the gyroscope's output while it is relatively still, and subtracting that output from all future gyroscopic readings. In one implementation, the relatively stillness is defined as the gyroscope and accelerometer outputs changing less than a predetermined amount (e.g., 1% of gravity and 1° per second, respectively) during a predetermined time period (e.g., 4 samples). The sitting still drift can be further reduced by setting the drift corrected output to zero whenever it is below a predetermined value (e.g., 0.5° per second). The gyroscopic drift may also be a function of the gyroscope's rotational speed (i.e., the magnitude of the angular velocity vector), with the gyroscopic drift increasing as the rotational speed increases. Thus, a sample's drift can be determined as a fraction of its current rotational speed times the sample period.

$\Delta\theta_{Drift} = F_D \sqrt{\omega_x^2 + \omega_y^2 + \omega_z^2} \Delta t$ $\Delta\theta_{Drift}$=Sample's drift
$F_D$=Drift factor $\sqrt{\omega_x^2 + \omega_y^2 + \omega_z^2}$=Rotational speed $\Delta t$=Sample period The gyroscopic drift estimate block 123 provides a gyroscopic drift estimate 133 having $\Delta\theta_{Drift}$ to the gyroscopic orientation error estimate block 125. The gyroscopic orientation error estimate block 125 receives the gyroscopic drift estimate 133 and a field-gyroscopic mixing factor 183 from a field-gyroscopic mixing factor block 181, and generates a gyroscopic orientation error estimate 135 of the current sample (e.g., sample n+1). As the field-gyroscopic mixing factor block 181 increases the mixing factor of a field orientation estimate 178 and decreases the mixing factor of the gyroscopic orientation estimate 132, the gyroscopic orientation error estimate 135 reduces, because the output device orientation estimate block 127 used to generate the gyroscopic orientation estimate 132 approaches the field orientation estimate 178 as more field orientations are mixed in.

The gyroscopic orientation error estimate 135 from the gyroscopic orientation error estimate block 125 can be determined as follows:

$$\theta_{GE,n+1} = F_{m\omega}\theta_{GE,n} + \Delta\theta_{Drift}$$

$\theta_{GE,n}$ = Gyroscope orientation error estimate for sample n
$F_{m\omega}$ = Gyroscopic mixing factor The gyroscopic orientation error estimate 135 can later aid in determining whether the accelerometer 141 and magnetometer 161 should be enabled.

In the gyroscope block 120, the gyroscope 121 also provides the gyroscopic input 131 to the centripetal acceleration estimate block 124, which generates and provides a centripetal acceleration estimate 134 having centripetal angular error ($\theta_c$) to the accelerometer power control block 144. For example, the centripetal acceleration estimate block 124 estimates the acceleration measured by the accelerometer 141 due to centripetal accelerations imposed on the accelerometer 141. These centripetal accelerations adversely affect the accelerometer 141's ability to measure gravitational acceleration in the direction of gravity. For example, if the orientation sensing device begins to spin, then the accelerometer 141's readings may be dominated by the centripetal acceleration, thus adversely affecting the accelerometer 141's ability to measure gravitational acceleration in gravity's measured direction. The greatest angular error occurs when the centripetal acceleration is perpendicular to gravity. In that case:

$$\theta_c = \arctan\left(\frac{a_r}{g}\right) = \arctan\left(l\frac{\|\omega\|^2}{g}\right) \cong l\frac{\|\omega\|^2}{g} \text{ for small } \theta_c \text{ therefore,}$$

$$\|\omega\| = \sqrt{\frac{g}{l}\tan(\theta_c)} = \text{the magnitude of the angular velocity}$$

$a_r$ = Centripetal acceleration $l$ = Distance between orientation sensing device and rotational axis $g$ = Magnitude of gravity $\theta_c$ = Centripetal angular error of gravity's measured direction The distance between the orientation sensing device and the rotational axis for a person wearing the orientation sensing device is typically between zero and one meter. Setting a predetermined maximum allowed centripetal angular error enables the orientation sensing device to use the magnitude of the gyroscope's measured angular velocity (e.g., the rotational speed, $\|\omega\|$) to aid in determining whether the accelerometer 141 should be enabled or disabled. For example, by setting a maximum allowed centripetal angular error to be 30° (e.g., $\theta_c=30°$), a centripetal velocity threshold (i.e., $\omega_{cT}$) can be predetermined, and subsequently used to aid in determining whether the accelerometer 141 should be enabled or disabled.

The accelerometer block 140 comprises the accelerometer 141, an accelerometer jitter estimate block 142, an accelerometer angular error estimate block 143, and an accelerometer power control block 144. In the present exemplary embodiment, the accelerometer 141 in the accelerometer block 140 may correspond to the accelerometer 141 in FIG. 1A, while the remaining functional blocks in the accelerometer block 140 may be part of the IMU application 195 in FIG. 1A.

The accelerometer block 140 is configured to process accelerometer inputs or readings, and further process the inputs from the gyroscope block 120 to determine whether to enable or disable the accelerometer 141. When the accelerometer 141 is enabled, the accelerometer block 140 can also aid in determining whether the magnetometer 161 should be enabled and disabled, and provide inputs to the magnetometer block 160 for determining a field orientation estimate based upon the Earth's gravitational and magnetic fields.

In FIG. 1B, the accelerometer 141 provides an accelerometer input 151 to the accelerometer jitter estimate block 142, the accelerometer angular error estimate block 143, and the accelerometer filter 162. For example, as an accelerometer reading (e.g., an accelerometer sample) arrives from the accelerometer 141, it is forwarded to the accelerometer jitter estimate block 142, which estimates an accelerometer jitter estimate 152 having $\overline{\theta_{AJ}}$, which represents the amount of jitter inherent to the accelerometer 141, by averaging the magnitude of the distance of the accelerometer reading from gravity when the accelerometer 141 is relatively still.

$$\overline{\theta_{AJ}} = \frac{|\|a\| - g|}{g}, \text{ while relatively still}$$

The accelerometer jitter estimate block 142 provides the accelerometer jitter estimate 152 having $\overline{\theta_{AJ}}$ to the accelerometer power control block 144 to aid in determining whether the accelerometer 141 should be enabled or disabled. The accelerometer jitter estimate 152 having $\overline{\theta_{AJ}}$ can be retained, for example, in the non-transitory memory 194 in FIG. 1A even when the accelerometer 141 is powered off. The accelerometer jitter estimate 152 having $\overline{\theta_{AJ}}$ is also used by the accelerometer filter 162 to gate data entering the accelerometer filter 162. By way of example, to decide what accelerometer values can enter the accelerometer filter 162, the difference in sequential readings from the accelerometer 141 is observed and compared to the accelerometer jitter estimate 152. If the sequential reading difference is larger than the accelerometer jitter estimate 152, then the accelerometer input 151 is barred from entering the accelerometer filter 162 (i.e., the accelerometer values are truncated from the filter), because the orientation sensing device is likely to be moving, hence not likely to improve the orientation estimate of the orientation sensing device. If the sequential reading difference is less than the accelerometer jitter estimate 152, then the accelerometer values may enter the accelerometer filter 162 to fill up the filter. It is noted that the accelerometer filter 162 may be a variable length filter where the length of the filter can be adjusted to suit the specific needs of a particular application.

The accelerometer power control block 144 controls both the accelerometer 141's power and the processing of the remaining functional blocks in the accelerometer block 140. The accelerometer power control block 144 enables the accelerometer 141, when the following conditions are met:
(1) the magnitude of the angular velocity measured by the gyroscope 121 is less than the centripetal velocity threshold (i.e., $\|\omega\| < \omega_{cT}$); and
(2) the accelerometer jitter error estimate 152 is less than the gyroscopic orientation error estimate 135 (i.e., $\overline{\theta_{AJ}} < \theta_{GE,n}$); and
(3) a filled accelerometer filter length 172a is less than the full (i.e., maximum) length of the accelerometer filter 162 (i.e., $L_{fa} < L_{fa,max}$); and
(4) a filled magnetometer filter length 173a is less than the full (i.e., maximum) length of the magnetometer filter 163 (i.e., $L_{fm} < L_{fm,max}$).

When all of the four conditions above are met, the accelerometer power control block 144 enables the accelerometer 141 as well as the remaining functional blocks in the accelerometer block 140.

$$E_a = (\|\omega\| < \omega_{cT}) \&\& ( \overline{\theta_{AJ}} < \theta_{GE,n}) \&\& (L_{fa} < L_{fa,max}) \&\& (L_{fm} < L_{fm,max})$$

$E_a$=Accelerometer enable
$\omega_{cT}$=Centripetal velocity threshold

In the accelerometer block 140, the accelerometer 141 also provides the accelerometer input 151 to the accelerometer angular error estimate block 143, which estimates the angular error of the accelerometer measurement from gravity's direction. The accelerometer 141 measures both centripetal and gravitational accelerations. Deviations in the measurement from the magnitude of gravity are caused by centripetal accelerations and cause errors in estimating the direction of gravity. When the measured acceleration is larger than the magnitude of gravity (e.g., the magnitude of the acceleration due to gravity, g=9.8 m/s$^2$), the accelerometer gravitational error angle, $\theta_{AGE}$, can be determined by:

$$\theta_{AGE} = \frac{\|a\| - g}{g}$$

$\theta_{AGE}$ = Accelerometer gravitational error angle

When the measured acceleration is less than the magnitude of gravity, the accelerometer gravitational error angle can be determined by:

$$\theta_{AGE} = \frac{g - \|a\|}{\|a\|}$$

An accelerometer angular error estimate 153 having $\theta_{AGE}$ is used by the magnetometer power control block 167 to aid in determining whether the magnetometer 161 should be enabled or disabled.

The magnetometer block 160 comprises the magnetometer 161, the accelerometer filter 162, the magnetometer filter 163, a vertical rotation estimate block 164, a horizontal rotation estimate block 165, a magnetometer jitter estimate block 166, the magnetometer power control block 167, a field orientation estimate block 168, a field-gyroscopic orientation offset block 169, a field orientation error estimate block 170, the field-gyroscopic mixing factor block 181, and a mixed field-gyroscopic orientation estimate block 182. In the present exemplary embodiment, the magnetometer 161 in the magnetometer block 160 may correspond to the magnetometer 161 in FIG. 1A, while the remaining functional blocks in the magnetometer block 160 may be part of the IMU application 195 in FIG. 1A. In the present exemplary embodiment, the magnetometer block 160 is configured to process magnetometer inputs or readings, and further process the accelerometer inputs to provide a field orientation estimate based upon the Earth's gravitational and magnetic fields.

The magnetometer power control block 167 enables and disables the magnetometer 161 and the remaining functional blocks in the magnetometer block 160 when the following conditions are met:
(1) the accelerometer power control block 144 has enabled the accelerometer 141; and
(2) the accelerometer angular error estimate 153 having the accelerometer gravitational error angle $\theta_{AGE}$ is less than a predetermined accelerometer gravitational error angle threshold (i.e., $\theta_{AGE,min}$), such as 30°.

When both of the conditions above are met, the magnetometer power control block 167 enables the magnetometer 161 as well as the remaining functional blocks in the magnetometer block 160.

$$E_m = E_a \&\& (\theta_{AGE} < \theta_{AGE,min})$$

$E_m$=Magnetometer enable

When the magnitude of the angular velocity measured by the gyroscope 121 is greater than or equal to the centripetal velocity threshold, then if even the accelerometer 141 and the magnetometer 161 were enabled, the readings from the accelerometer 141 and the magnetometer 161 would result in poor field orientation estimates, because the orientation sensing device is undergoing significant centripetal acceleration relative to gravitational acceleration. Therefore, the sensor selecting method advantageously disables the accelerometer and magnetometer to extend the battery life of the orientation sensing device.

Moreover, the filled accelerometer filter length 172a reaches the full length of the accelerometer filter 162, for example, when a first predetermined number of consecutive accelerometer samples are within a predetermined magnitude of gravity. The filled magnetometer filter length 173a reaches the full length of the magnetometer filter 163 when a second predetermined number of consecutive magnetometer samples are within a predetermined orientation angular distance. Under these conditions, the sensor selecting method also disables the accelerometer and magnetometer because the orientation sensing device's gyroscopic orientation estimate is as accurate as the field orientation estimate. Thus, disabling the accelerometer and magnetometer under these conditions can substantially reduce power consumption of the orientation sensing device.

As stated above, as an accelerometer sample arrives from the accelerometer 141, it is forwarded to the accelerometer filter 162 for filtering. Similarly, as a magnetometer sample arrives from the magnetometer 161, it is forwarded to the magnetometer filter 163 for filtering. The accelerometer filter 162 and the magnetometer filter 163 are variable length filters that are reset to a length of zero whenever the magnetometer power control block 167 disables the magnetometer block 160. The filters each can grow by one sample as new data is input into them, up to the full (i.e., maximum) length of each filter (e.g., 32 samples). Various methods are available for determining which past samples should be filtered with the newest sample as each new sample arrives. For example, the method may determine the average value of the most recently arrived values since the magnetometer block 160 was enabled, up to the maximum number of samples the filter can hold. Then, the method may fill the filter only with values within a distance of the average value. The distance may be a predetermined multiple of the accelerometer 141's or the magnetometer 161's inherent jitter. The current filled accelerometer filter length 172a and the current filled magnetometer filter length 173a are provided to the gyroscopic/mixed field-gyroscopic orientation selection block 126 to aid in selecting the output device orientation estimate 137 as described above.

Filtered accelerometer values 172b and filtered magnetometer values 173b are provided to the vertical rotation estimate block 164 and the horizontal rotation estimate block 165, respectively. A vertical rotation estimate 174 from the vertical rotation estimate block 164 and a horizontal rotation estimate 175 from the horizontal rotation estimate block 165 are then provided to the field orientation estimate block 168, which generates the orientation sensing device's orientation estimate relative to the Earth's gravitational and magnetic fields to provide the field orientation estimate 178.

By way of example, the field orientation estimate 178 is represented a field quaternion, $_E^S Q_f$, which is the orientation sensing device's field orientation estimate relative to Earth. The method of generating the field orientation estimate 178 is described in detail in the 14/873,946 application. However, briefly, the vertical rotation estimate 174 is determined based upon the accelerometer measurement.

$a_m$ = Accelerometer measurement $a = (a_x, a_y, a_z) = \dfrac{a_m}{\|a_m\|}$ = Normalized accelerometer measurement $r = \sqrt{\dfrac{1 + a_z}{2}}$ $_E^v Q = r + \dfrac{\hat{i} a_y - \hat{j} a_x}{2r}$ The horizontal rotation estimate 175 is determined based upon the magnetometer measurement, rotated by the previously calculated vertical rotation.

$m_m$ = Magnetometer measurement $m_v = {_E^v Q}\, m_{mv}\, {_v^E Q}$ = Vertically rotated $m = (m_x, m_y, 0) = \dfrac{\hat{i} m_{vx} + \hat{j} m_{vy}}{\sqrt{m_{vx}^2 + m_{vy}^2}}$ = Normalized vertically rotated $r = \sqrt{\dfrac{1 - m_x}{2}}$ $_E^h Q = r + \hat{k}\, \mathrm{sgn}(m_y)\sqrt{1 - r^2}$ The orientation sensing device's field orientation estimate 178 is generated by multiplying the vertical rotation estimate 174 by the horizontal rotation estimate 175.

$_E^S Q_f = {_E^h Q}\, {_E^v Q}$ = Field orientation estimate

The magnetometer jitter estimate block 166 estimates an magnetometer jitter estimate 176 having $\overline{\theta_{MJ}}$, which represents the amount of jitter inherent to the magnetometer 161, by averaging the magnitude of the distance between successive magnetometer readings when the magnetometer 161 is relatively still.

$\overline{\theta_{MJ}} = \dfrac{\|\Delta m\|}{\|m\|}$, while relatively still

The magnetometer jitter estimate block 166 provides a magnetometer jitter estimate 176 having $\overline{\theta_{MJ}}$ to field orientation error estimate 170 to estimate a field orientation error. It is noted that a magnetometer jitter estimate 176 having $\overline{\theta_{MJ}}$ can be retained, for example, in the non-transitory memory 194 in FIG. 1A even when the magnetometer 161 is powered off, so that it is immediately available when the magnetometer 161 is enabled. The magnetometer jitter estimate 176 is also used by the magnetometer filter 163 to gate data entering the filter. By way of example, to decide what magnetometer values can enter the magnetometer filter 163, the difference in sequential readings from the magnetometer 161 is observed and compared to the magnetometer jitter estimate 176. If the sequential reading difference is larger than the magnetometer jitter estimate 176, then the magnetometer values are barred from entering the magnetometer filter 163 (i.e., the magnetometer values are truncated from the filter), because the orientation sensing device is likely to be moving, hence not likely to improve the orientation estimate of the device. If the sequential reading difference is less than the magnetometer jitter estimate 176, then the magnetometer values may enter the magnetometer filter 163 to fill up the filter. It is noted that the magnetometer filter 163 may be a variable length filter where the length of the filter can be adjusted to suit the specific needs of a particular application.

Further following the methods described in the 14/873,946 application, the field-gyroscopic orientation offset block 169 determines the offset between the gyroscopic orientation estimate 132 and the field orientation estimate 178, and provides a field-gyroscopic orientation offset 179 having $\theta_{f\omega}$ to the field-gyroscopic mixing factor block 181.

$\theta_{f\omega} = 2\sqrt{1 - R({_E^S Q_{fE}}\, {^S Q'_\omega})}$ = Field-Gyroscopic orientation offset Following the 14/873,946 application, the field orientation error estimate block 170 estimates a field orientation error estimate 180 having $\theta_{\Delta f}$ as the maximum of the centripetal acceleration estimate 134 having $\theta_c$ by the centripetal acceleration estimate block 124 and the accelerometer gravitational error angle having $\theta_{AGE}$ by the accelerometer angular error estimate block 143, plus the magnetometer jitter estimate 176 multiplied by a predetermined scaling factor (e.g. 4) and divided by the square root of the filled magnetometer filter length 173a. As the filled magnetometer filter length 173a increases, the field orientation error estimate 180 decreases.

$\theta_{\Delta f} = \max(\theta_c, \theta_{AGE}) + \dfrac{F_{jm} \overline{\theta_{MJ}}}{\sqrt{L_{fm}}}$ = Field orientation error estimate $F_{jm}$ = Jitter scaling factor Again following the 14/873,946 application, the field-gyroscopic mixing factor block 181 determines the field-gyroscopic mixing factor 183 (i.e., a mixing ratio) of the field and gyroscopic orientations used by the mixed field-gyroscopic orientation estimate block 182 to generate the mixed field-gyroscopic orientation estimate 184, with the field-gyroscopic mixing factor 183 increasing toward 1 as the field orientation error estimate 180 reduces relative to the field-gyroscopic orientation offset 179.

$$F_{mf} = \max\left(0, 1 - \frac{\theta_{\Delta f}}{\theta_{f\omega}}\right) = \text{Field mixing factor}$$

$$F_{m\omega} = 1 - F_{mf} = \text{Gyroscopic mixing factor}$$

$${}_E^S Q_{f\omega} = F_{mf} {}_E^S Q_f + F_{m\omega} {}_E^S Q_\omega$$

The field-gyroscopic mixing factor 183 of the field-gyroscopic mixing factor block 181 is used by the gyroscopic orientation error estimate block 125 as described above to reduce the gyroscopic orientation error estimate 135 as the gyroscopic mixing factor decreases. Eventually, when the orientation sensing device is relatively still, the outputs of the filters stabilize as both accelerometer and magnetometer filters are filled, and additional updates do not significantly improve the orientation estimation. The sensor enabling method then disables the accelerometer and magnetometer.

Thus, by selectively enabling the accelerometer 141 and magnetometer 161 only when their inputs would improve the orientation estimate of the orientation sensing device, the battery power that would otherwise have been consumed by these two sensors can be saved, thereby extending the battery life of the orientation sensing device. For example, a conventional orientation sensing device may consume about 10 mA of current, with its magnetometer consuming approximately half of that current, about 5 mA. The conventional orientation sensing device has its accelerometer and magnetometer on all of the time when the orientation sensing device is operating. By contrast, the orientation sensing device 100 in FIG. 1A is configured to selectively enable the accelerometer 141 and magnetometer 161 only when their inputs would improve the orientation estimate, thereby extending the battery life of the orientation sensing device 100.

Figure 1C:
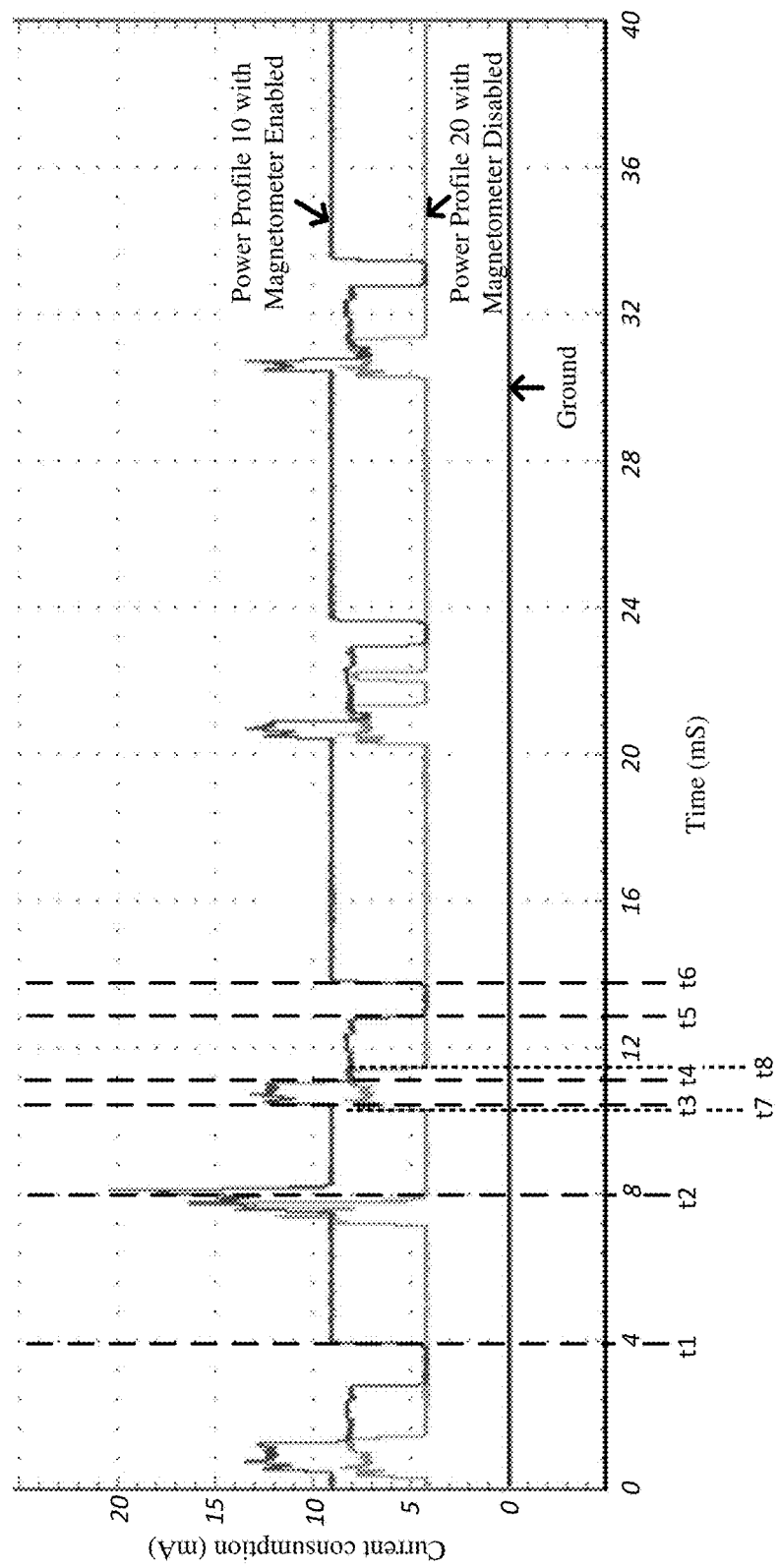
FIG. 1C is a diagram illustrating exemplary power profiles of an orientation sensing device according to an exemplary embodiment of the present application.

FIG. 1C is a diagram illustrating exemplary power profiles of an orientation sensing device according to an exemplary embodiment of the present application. For example, FIG. 1C shows an orientation sensing device's power profile 10 with its magnetometer enabled all of the time. The orientation sensing device samples at 100 Hz and transmits at 20 Hz. The power profile 10 shows the orientation sensing device's power consumption when the magnetometer is enabled. A power profile 20 shows the orientation sensing device's power consumption when the magnetometer is completely disabled.

As shown in the power profile 10, at time t1 (e.g., around 4 mS=4×10$^{-3}$ second), the magnetometer starts sampling. At time t1, the current consumption of the orientation sensing device increases from about 4 mA (i.e., 4×10$^{-3}$ amp) to about 9 mA (i.e., 9×10$^{-3}$ amp). At time t2 (e.g., around 8 mS), the power profile 10 shows a power spike indicating radio activities of the orientation sensing device. At time t3, the processor is turned on to generate the orientation sensing device's orientation estimate. At time t4, the magnetometer stops sampling, while the processor continues to be on to generate the orientation sensing device's orientation estimate. At time t5, the processor completes the computation and is turned off. At time t6, the magnetometer starts sampling again. As can be seen from the power profile 10, the magnetometer has an inherent duty cycle of approximately 75-80%. When the magnetometer is sampling, it consumes more than 50% of the instantaneous power supplied by the orientation sensing device's battery.

By contrast, the power profile 20 shows the power profile of the orientation sensing device with the magnetometer completely disabled at all times. The power profile 20 shows pulses near 0, 10, 20, and 30 mS which are the results of the processor generating the orientation sensing device's orientation estimate. For example, with the magnetometer completely disabled, the processor is turned on between t7 and t8 to generate the orientation sensing device's orientation estimate. By disabling the magnetometer, the current consumption of the orientation sensing device as shown by the power profile 20 is approximately 5 mA lower than the current consumption of the orientation sensing device as shown by the power profile 10 while the magnetometer is enabled.

The method described with reference to FIGS. 1A and 1B in the present application enables the orientation sensing device to operate similarly to the power profile 20 by selectively disabling its field sensors (i.e., the magnetometer and accelerometer) when their outputs would not improve the orientation sensing device's orientation estimate. As a result, the orientation sensing device according to the present application can significantly extend its battery life. In one implementation, by using the method described with reference to FIGS. 1A and 1B, the battery life of the orientation sensing device can be extended from about two hours (e.g., when the field sensors are on all of the time) to at least twelve hours (e.g., when the field sensors are selectively enabled).

FIG. 2A is a flowchart illustrating a method for selectively enabling IMU sensors according to one exemplary embodiment of the present application. In a flowchart 200, after the method starts at step 201, an accelerometer and a magnetometer of an orientation sensing device are disabled, and the filled accelerometer and magnetometer filter length are reset to zero at step 202. In step 203, the method determines whether a magnitude of an angular velocity measured by the gyroscope is less than a centripetal velocity threshold. If the magnitude of the angular velocity is less than the centripetal velocity threshold, then the flowchart 200 continues from step 203 to step 204. Otherwise, the flowchart 200 goes from step 203 back to step 202. In step 204, the method determines whether an accelerometer jitter error estimate is less than a gyroscopic orientation error estimate. If the accelerometer jitter error estimate is less than the gyroscopic orientation error estimate, then the flowchart 200 continues from step 204 to step 205. Otherwise, the flowchart 200 goes from step 204 back to step 202. In step 205, the method determines whether a filled accelerometer filter length is less than a full length of an accelerometer filter. If the filled accelerometer filter length is less than the full length of the accelerometer filter, then the flowchart 200 continues from step 205 to step 206. Otherwise, the flowchart 200 goes from step 205 back to step 202. In step 206, the method determines whether a filled magnetometer filter length is less than a full length of a magnetometer filter. If the filled magnetometer filter length is less than the full length of the magnetometer filter, then the flowchart 200 continues from step 206 to step 207 to enable the accelerometer. Otherwise, the flowchart 200 goes from step 206 back to step 202, where the accelerometer and the magnetometer both remain disabled. After the accelerometer is enabled in step 207, flowchart 200 continues from step 207 to step 208 to determine whether an accelerometer gravitational error angle is less than a predetermined accelerometer gravitational error angle threshold. If the accelerometer gravitational error angle is less than the predetermined accelerometer gravitational error angle threshold, then the flowchart 200 continues from step 208 to step 209 to enable the magnetometer. Otherwise, the flowchart 200 goes from step 208 back to step 203 to continue monitoring the gyroscope readings and gyroscopic orientation errors.

Figure 2B:
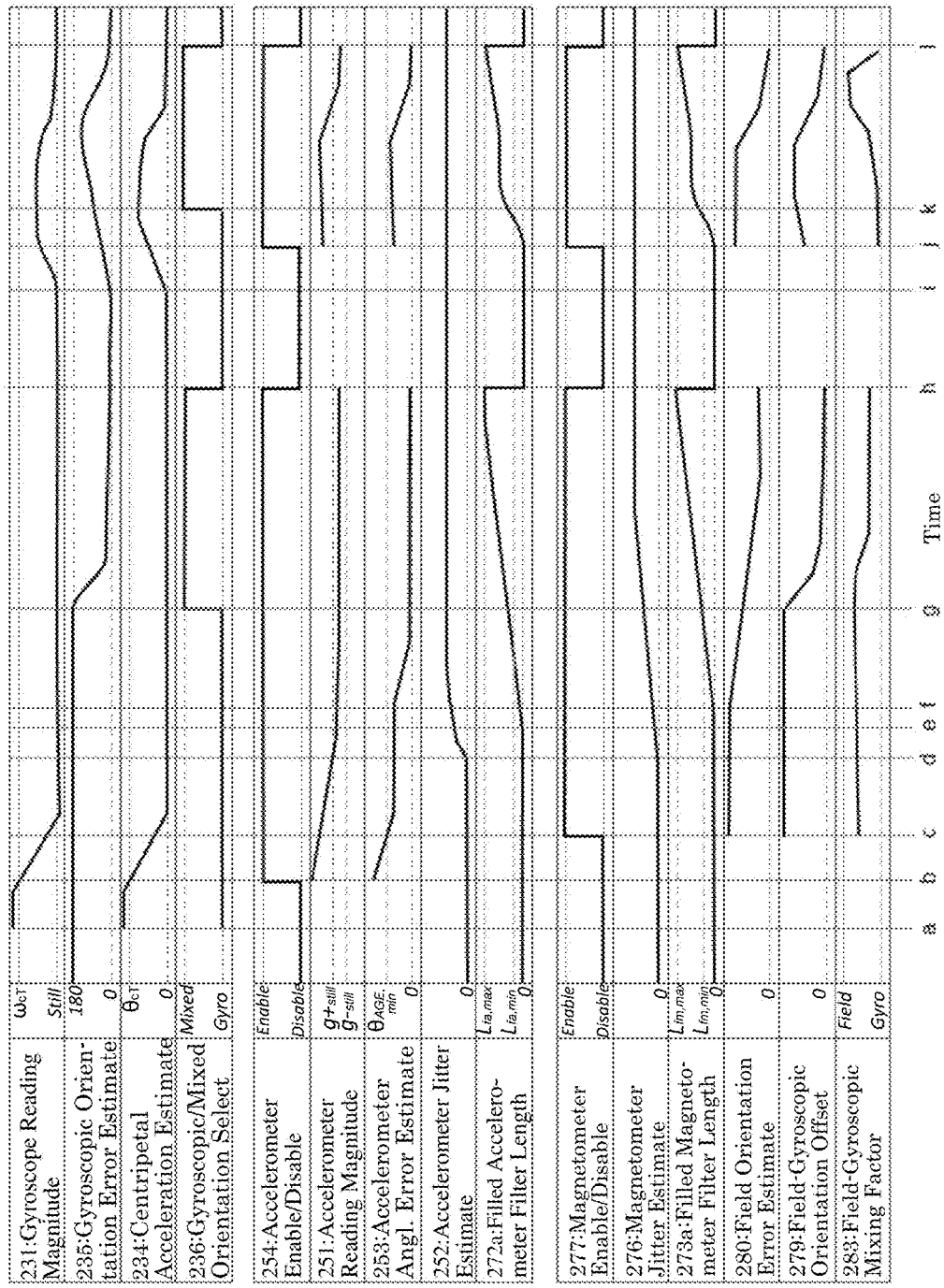
FIG. 2B is a diagram illustrating exemplary waveforms of an orientation sensing device having IMU sensors according to an exemplary embodiment of the present application.

FIG. 2B is a diagram illustrating exemplary waveforms of an orientation sensing device having IMU sensors according to an exemplary embodiment of the present application. As shown in FIG. 2B, at time a, the orientation sensing device using the method described herein is reset. During reset, the following signals are initialized. A gyroscopic orientation error estimate 235 (e.g., from the gyroscopic orientation error estimate block 125 in FIG. 1B) is set to a large angular error, such as 180°. An accelerometer enable/disable signal 254 (e.g., from the accelerometer power control block 144 in FIG. 1B) is set to Disabled, since the system is reset. An accelerometer jitter estimate 252 (e.g., from the accelerometer jitter estimate block 142 in FIG. 1B) is set to zero. A filled accelerometer filter length 272a (e.g., from the accelerometer filter 162 in FIG. 1B) is set to zero. A magnetometer enable/disable signal 277 (e.g., from the magnetometer power control block 167 in FIG. 1B) is set to Disabled, since the system is reset. A magnetometer jitter estimate 276 (e.g., from the magnetometer jitter estimate block 166 in FIG. 1B) is set to zero. A filled magnetometer filter length 273a (e.g., from the magnetometer filter 163 in FIG. 1B) is set to zero. Lastly, the output device orientation estimate (e.g., the output device orientation estimate 137 in FIG. 1B) is set to the null rotation (1, 0, 0, 0).

Immediately after reset, it is possible that the gyroscope measures a large rotational speed, causing the accelerometer power control block 144 to keep the accelerometer block 140 disabled, and the magnetometer power control block 167 to keep the magnetometer block 160 disabled. At this time, sensor orientations have not yet used a field orientation determination and therefore have no Earth reference.

At time b, the orientation sensing device's movement decreases to where a gyroscope input 231 having the magnitude of rotational speed ($\|\omega\|$) drops below the centripetal threshold ($\omega_{cT}$), and a centripetal acceleration estimate 234 (e.g., from the centripetal acceleration estimate block 124 in FIG. 1B) drops below the threshold ($\theta_{cT}$). The accelerometer power control block 144 then enables the accelerometer block 140, as shown by the accelerometer enable/disable signal 254, because the accelerometer enable criteria have been met, since reset set the accelerometer jitter to zero, the gyroscope orientation error estimate to 180°, and the filled accelerometer and magnetometer filter lengths to zero.

$$E_a = (\|\omega\| < \omega_{cT}) \&\& ( \theta_{AJ} < \theta_{GE,n}) \&\& (L_{fa} < L_{fa,max}) \&\& (L_{fm} < L_{fm,max})$$

Immediately after the accelerometer is enabled, it is possible that the accelerometer angular error estimate block 143 determines that an accelerometer angular error estimate is greater than the threshold required by the magnetometer power control block 167 to turn on the magnetometer, as shown by an accelerometer angular error estimate 253, and the magnetometer remains disabled, as shown by the magnetometer enable/disable signal 277.

At time c, the orientation sensing device's movement decreases to where the accelerometer angular error estimate 253 drops below the threshold, $\theta_{AGE,min}$, and the magnetometer power control block 167 then enables the magnetometer block 160, as shown by the magnetometer enable/disable signal 277, because the magnetometer enable criteria have been met.

$$E_m = E_a \&\& (\theta_{AGE} < \theta_{AGE,min})$$

The accelerometer filter 162 and the magnetometer filter 163 then begin receiving data. However, since the accelerometer and magnetometer average jitter values were set to zero at reset, the filters discard the data until the accelerometer and magnetometer are relatively still long enough for their average jitter magnitudes to increase to their respective inherent jitter magnitudes. Optionally, once these magnitudes are obtained, they can be stored in a non-volatile memory for later recall after a reset condition.

At time d, the gyroscope and accelerometer reading magnitudes are sufficiently still for the jitter values to update. At times e and f, respectively, the accelerometer and magnetometer average jitter magnitudes are sufficiently large for incoming data to be below the threshold required for the filters to process the data. The outputs of the filters then flow through the remainder of the magnetometer block 160 to provide the mixed field-gyroscopic orientation estimate at the mixed field-gyroscopic orientation estimate block 182.

At time g, the accelerometer and magnetometer filter lengths are sufficiently large for the gyroscopic/mixed field-gyroscopic orientation selection block 126 to switch from selecting the gyroscopic orientation estimate 132 from the gyroscopic orientation estimate block 122 to selecting the mixed field-gyroscopic orientation estimate 184 from the mixed field-gyroscopic orientation estimate block 182, because the select gyroscope criteria are no longer being met.

$$G_{Sel} = (L_{fa} < L_{fl,min}) \| (L_{fm} < L_{fm,min}) \| (C_{pm} == \text{disabled})$$

As the field orientation estimate is mixed with the gyroscopic orientation estimate, the output device orientation estimate of the output device orientation estimate block 127 provides better estimates of the orientation sensing device's orientation, and the gyroscopic and field orientation estimates better track each other, causing the field-gyroscopic orientation offset to approach zero, as shown in a field-gyroscopic orientation offset 279. The field-gyroscopic mixing factor also trends back toward gyroscope as the magnetometer jitter becomes significant relative to the field-gyroscopic orientation offset.

At time h, the accelerometer filter 162 and the magnetometer filter 163 have reached their full lengths, so the accelerometer block 140 is disabled, causing the magnetometer block 160 to be disabled, and the gyroscopic/mixed field-gyroscopic orientation selection block 126 switches back to the gyroscopic orientation estimate.

From time i to time 1, the waveforms show an example of the present method's processing of small motions. At time i, the orientation sensing device begins to move again, and the gyroscope orientation error estimate 235 begins to increase. At time j, the current gyroscopic orientation error estimate 235 is larger than the accelerometer jitter, while the gyroscope measurement is below the centripetal threshold, so the accelerometer is enabled.

$$E_a = (\|\omega\| < \omega_{cT}) \&\& ( \theta_{AJ} < \theta_{GE,n}) \&\& (L_{fa} < L_{fa,max}) \&\& (L_{fm} < L_{fm,max})$$

The accelerometer error angle is also below its threshold, as shown in the accelerometer angular error estimate 253, so the magnetometer is again enabled. The accelerometer filter 162 and the magnetometer filter 163 begin filling with data, since the accelerometer and magnetometer jitter estimates were already available from previous processing.

At time k, the accelerometer filter 162 and the magnetometer filter 163 have reached their minimum thresholds for the gyroscopic/mixed field-gyroscopic orientation selection block 126 to select the mixed field-gyroscopic orientation estimate instead of the gyroscopic orientation estimate. Since the orientation sensing device is rotating, as shown by the gyroscope reading magnitude 231, the accelerometer and magnetometer filter lengths are not able to reach their maximum values due to the recent samples having difference magnitudes comparable to the inherent jitter of each of the accelerometer and magnetometer. The short magnetometer filter length also increases the field orientation error estimate, which in turn reduces the mixing ratio of the field orientation estimate. At time 1, the orientation sensing device becomes still, causing the accelerometer filter 162 and the magnetometer filter 163 to reach their full lengths and the accelerometer and magnetometer blocks are disabled again.

Large sensor motions cause the method to operate similar to the small sensor motions. The only additional processing is that the accelerometer may remain disabled until the centripetal acceleration estimate is below its required threshold, similar to the first example provided earlier, and the magnetometer may remain disabled until the accelerometer angle error estimate is below its threshold, also similar to the example shown from time a through time h.

In FIGS. 1A, 1B, 2A and 2B, the sensor enabling method enables the accelerometer and magnetometer only when the field orientation estimate derived from the accelerometer and magnetometer readings is likely to improve the output device orientation estimate of the orientation sensing device relative to using just the gyroscopic orientation estimate derived from the gyroscope of the orientation sensing device. The sensor enabling method disables the accelerometer and magnetometer when the orientation sensing device's gyroscopic orientation estimate is as accurate as its field orientation estimate. As such, the sensor enabling method can substantially reduce power consumption of the orientation sensing device when the accelerometer and magnetometer are disabled, thereby extending the battery life of the orientation sensing device.

I claim:

1. A method for selectively enabling inertial measurement unit (IMU) sensors, the method comprising:
    enabling a gyroscope of the IMU sensors for generating a device orientation output estimate;
    enabling an accelerometer of the IMU sensors for improving the device orientation output estimate when:
        a magnitude of an angular velocity is less than a centripetal velocity threshold;
        an accelerometer jitter error estimate is less than a gyroscopic orientation error estimate;
        a filled accelerometer filter length is less than a full length of an accelerometer filter; and
        a filled magnetometer filter length is less than a full length of a magnetometer filter.

2. The method of claim 1 further comprising:
    enabling a magnetometer of the IMU sensors when:
        the accelerometer is enabled; and
        an accelerometer gravitational error angle is less than a predetermined accelerometer gravitational error angle threshold.

3. The method of claim 2 further comprising generating a field orientation estimate when the magnetometer is enabled.

4. The method of claim 2 further comprising selectively mixing a field orientation estimate and a gyroscopic orientation estimate to generate a mixed field-gyroscopic orientation estimate when the magnetometer is enabled.

5. The method of claim 2 further comprising:
    selecting a gyroscope orientation estimate to be the device orientation output estimate when:
        the filled accelerometer filter length is less than a predetermined minimum length of the accelerometer filter;
        the filled magnetometer the filter length is less than a predetermined minimum length of the magnetometer filter; or
        the magnetometer is disabled.

6. The method of claim 2 further comprising:
    selecting a mixed field-gyroscopic orientation estimate to be the device orientation output estimate when:
        the filled accelerometer filter length is greater than a predetermined minimum length of the accelerometer filter;
        the filled magnetometer filter length is greater than a predetermined minimum length of the magnetometer filter; and
        the magnetometer is enabled.

7. The method of claim 2 further comprising:
    disabling the magnetometer when the filled magnetometer filter length is equal to the full length of the magnetometer filter; and
    resetting the filled magnetometer filter length to zero.

8. The method of claim 1 further comprising:
    disabling the accelerometer when the filled accelerometer filter length is equal to the full length of the accelerometer filter; and
    resetting the filled accelerometer filter length to zero.

* * * * *